United States Patent [19]
Hybiske

[11] Patent Number: 5,421,452
[45] Date of Patent: Jun. 6, 1995

[54] DATA DISK CASE WITH SLIDABLE TRAY SECTION

[76] Inventor: James E. Hybiske, 1136 Halsey, Foster City, Calif. 94404

[21] Appl. No.: 143,216

[22] Filed: Oct. 26, 1993

[51] Int. Cl.⁶ .................. B65D 85/57; B65D 5/38
[52] U.S. Cl. .................. 206/312; 206/308.1; 206/308.3
[58] Field of Search .............. 206/313, 312, 309; 229/9, 19

[56] References Cited

U.S. PATENT DOCUMENTS

| | | | |
|---|---|---|---|
| 1,955,633 | 4/1934 | Hill | 229/9 |
| 3,116,005 | 12/1963 | Skaggs . | |
| 3,876,134 | 4/1975 | Rice et al. | 206/312 X |
| 4,453,631 | 6/1984 | Mark | 206/313 |
| 4,473,153 | 9/1984 | Colangelo . | |
| 4,709,812 | 12/1987 | Kosterka . | |
| 4,905,831 | 3/1990 | Bagdis et al. . | |
| 5,048,681 | 9/1991 | Henkel . | |
| 5,088,599 | 2/1992 | Mahler | 206/313 |
| 5,147,036 | 9/1992 | Jacobs | 206/313 X |
| 5,154,284 | 10/1992 | Starkey . | |
| 5,188,229 | 2/1993 | Bernstein . | |

FOREIGN PATENT DOCUMENTS 2234202  1/1975  France .
570351  3/1932  Germany ........................ 229/9

Primary Examiner—Bryon P. Gehman
Attorney, Agent, or Firm—Heller, Ehrman, White & McAuliffe

[57] ABSTRACT

A data disk case consisting of a tray section for holding the data disk, and a pocket section into which the tray section is slidably mounted. The data disk can be placed into, and removed from, the case with a minimum of abrasion between the disk and the case, thereby preventing scratching of the disk. The tray and the pocket are each fabricated from a single sheet of cardboard. The tray section has a pair of glue flaps which slide along the interior of the pocket section. A pair of catch tabs in the interior of the pocket section constrain the tray to the pocket by engaging the glue flaps when the tray is pulled up from the pocket.

14 Claims, 8 Drawing Sheets

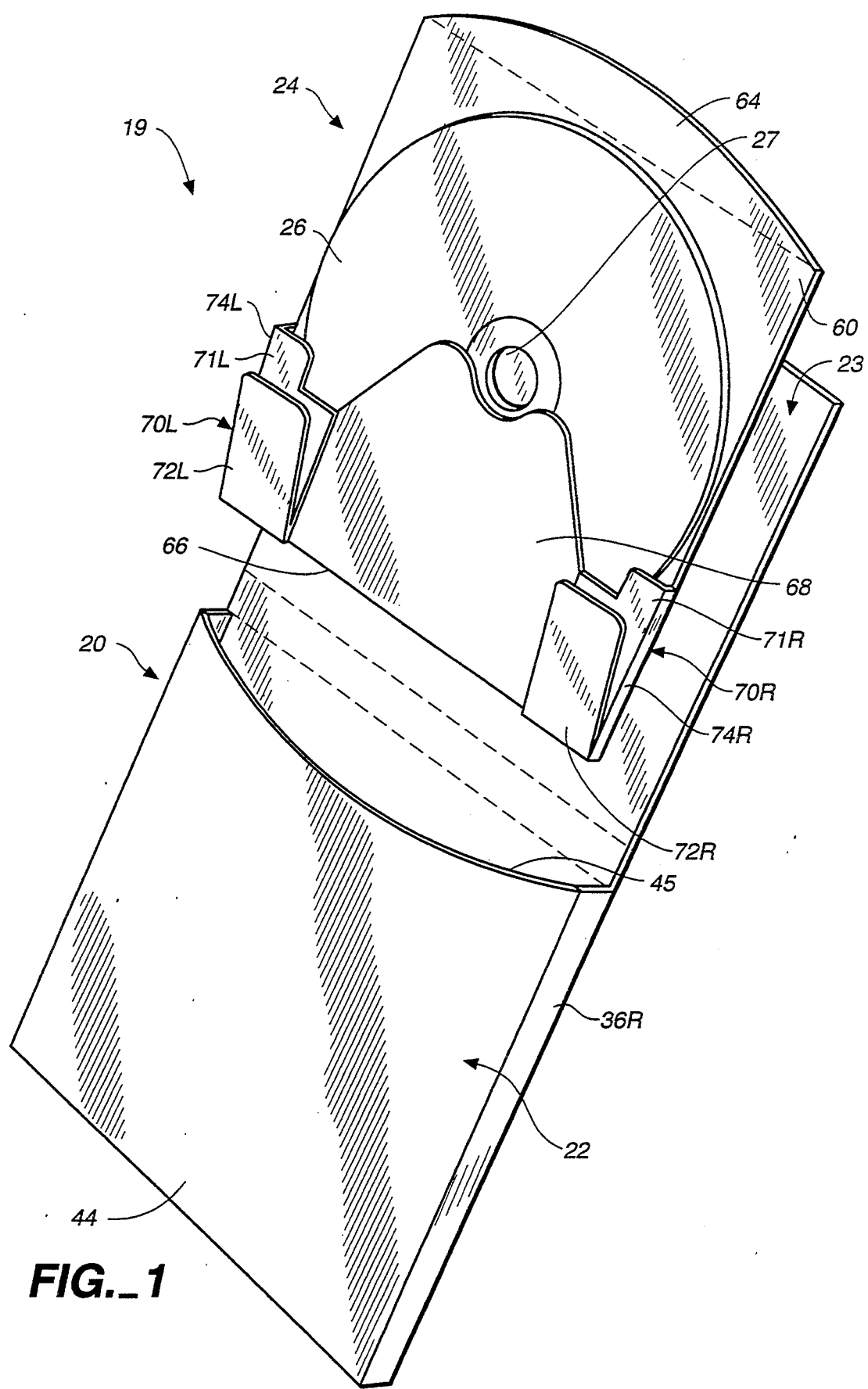
FIG._1

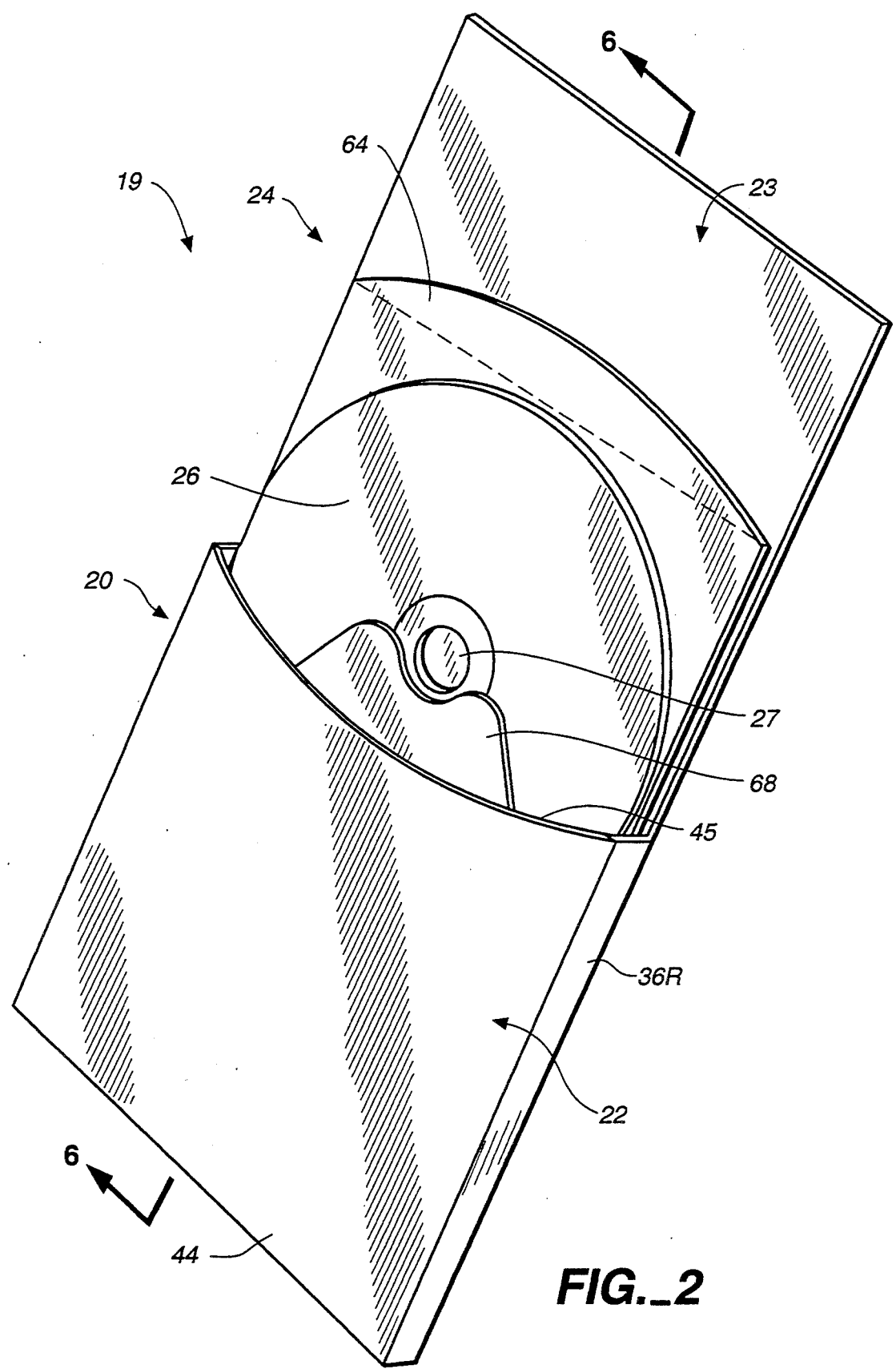
FIG._2

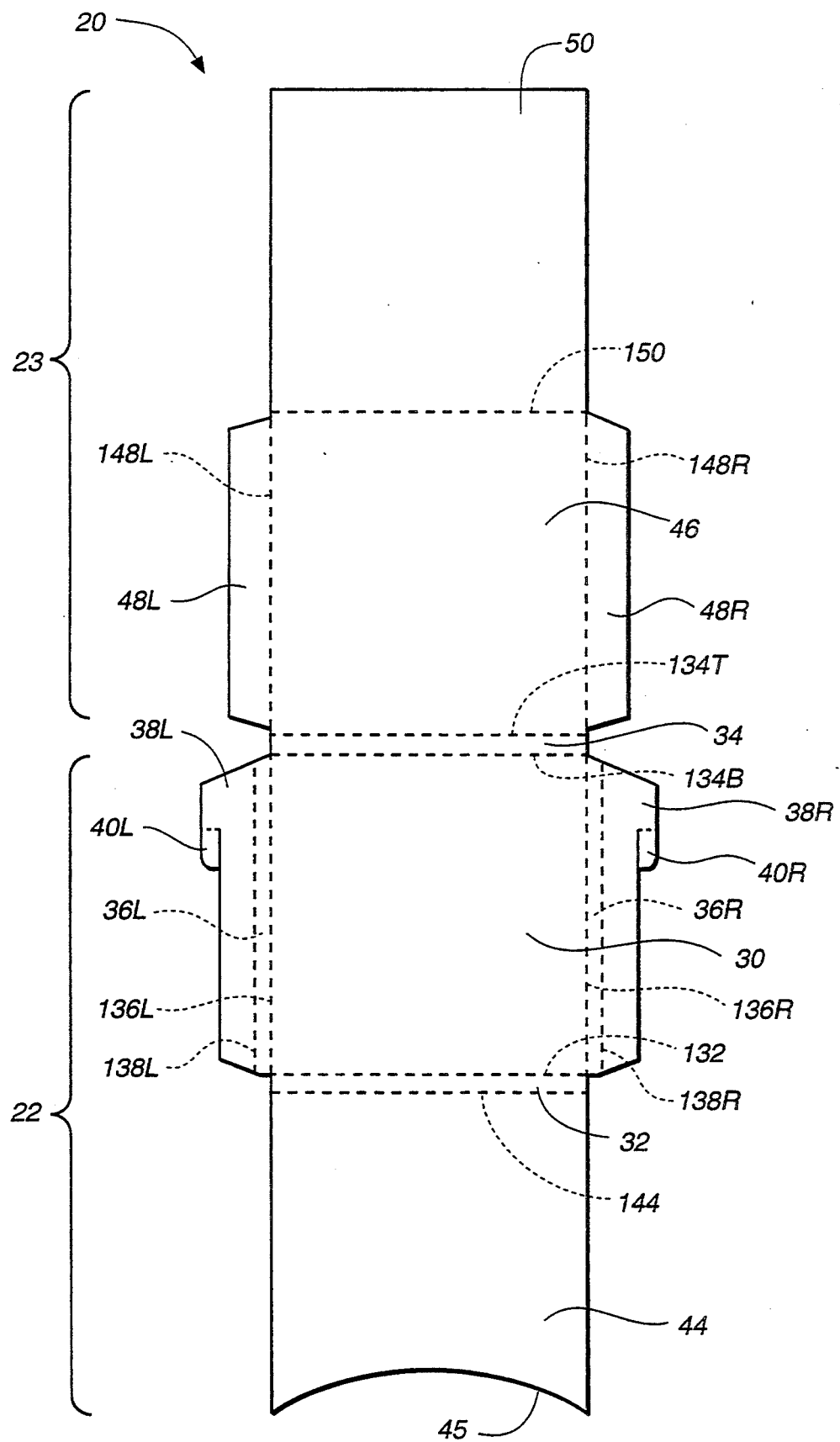
FIG._3

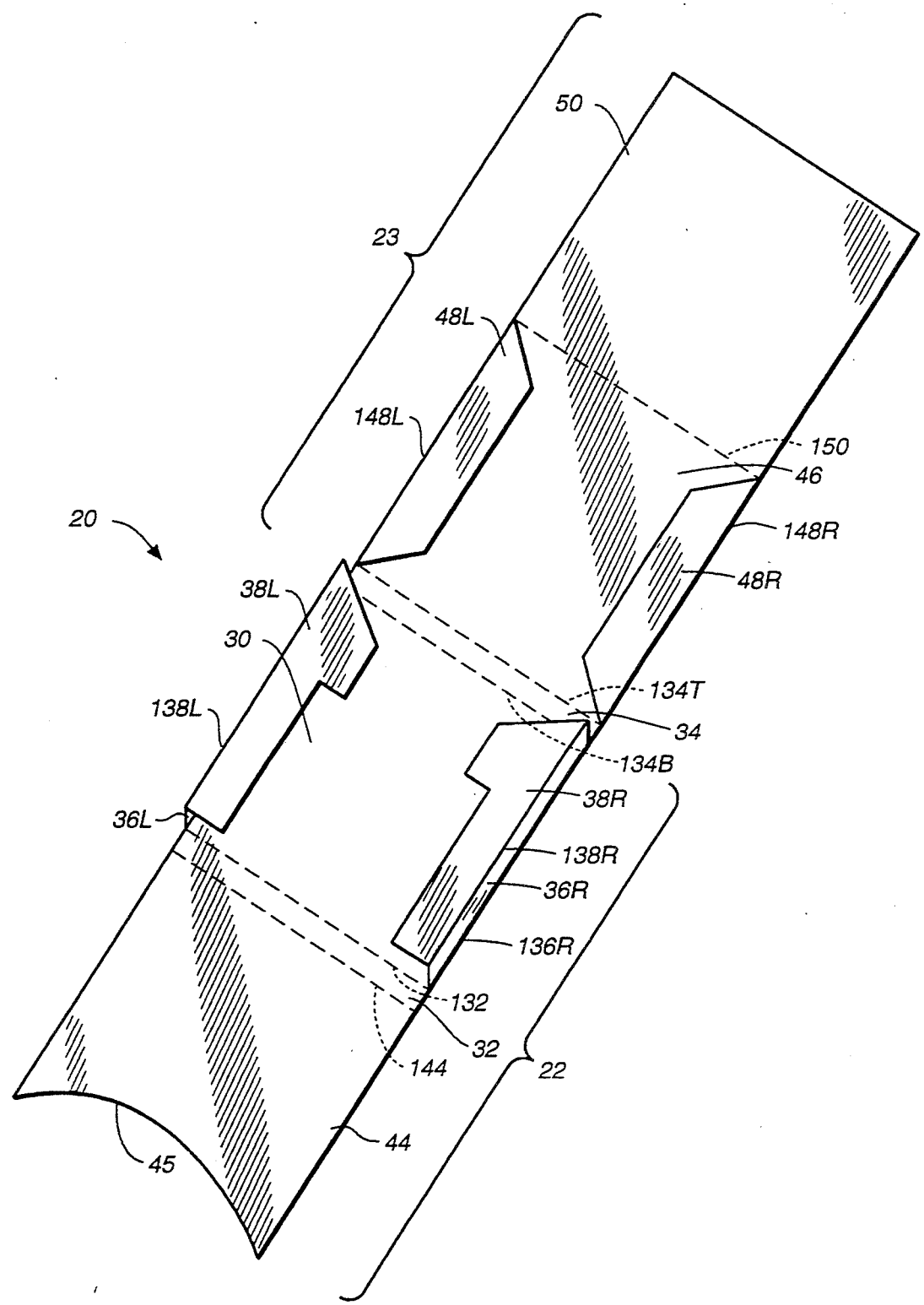
FIG._4

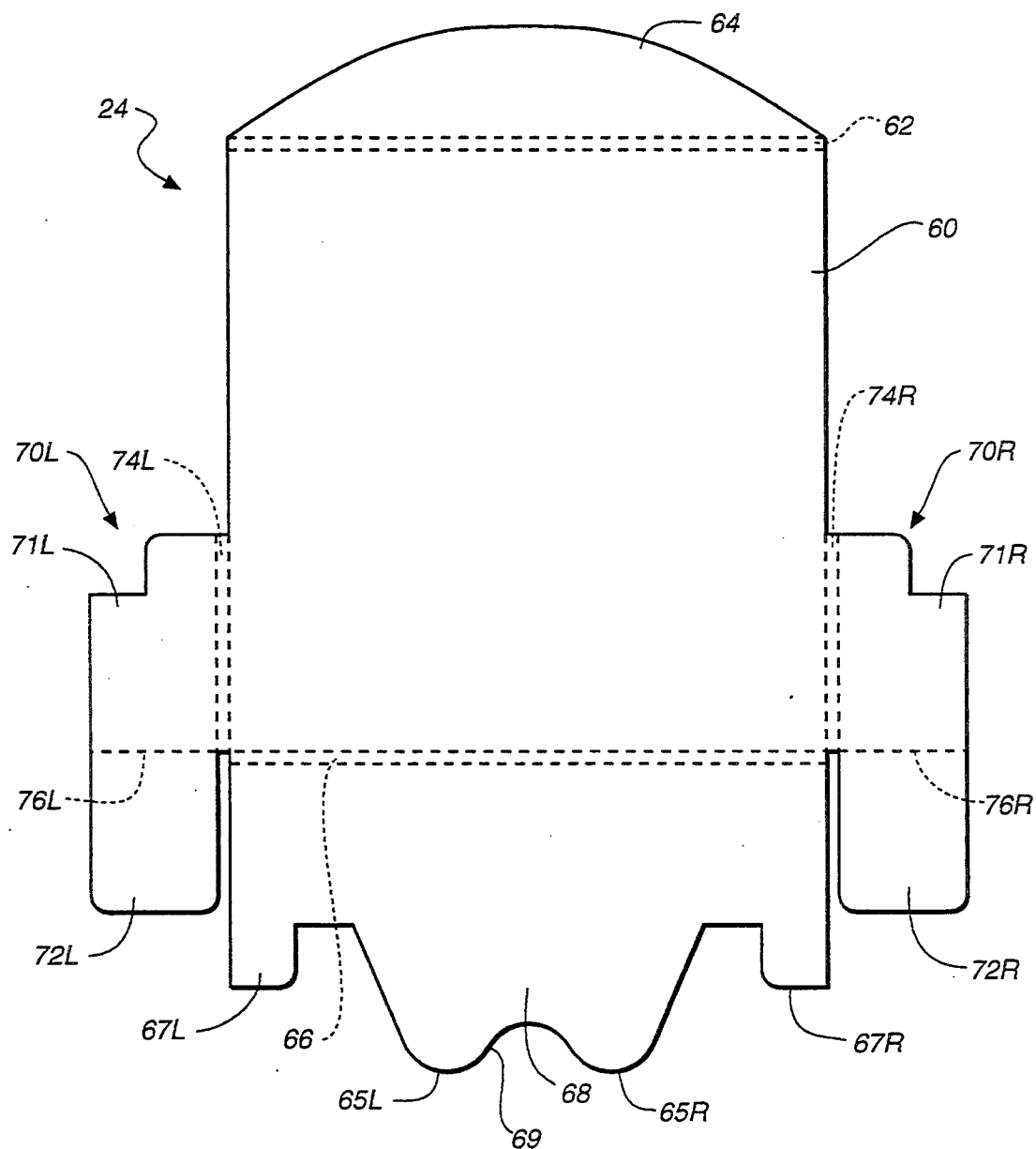
FIG._5

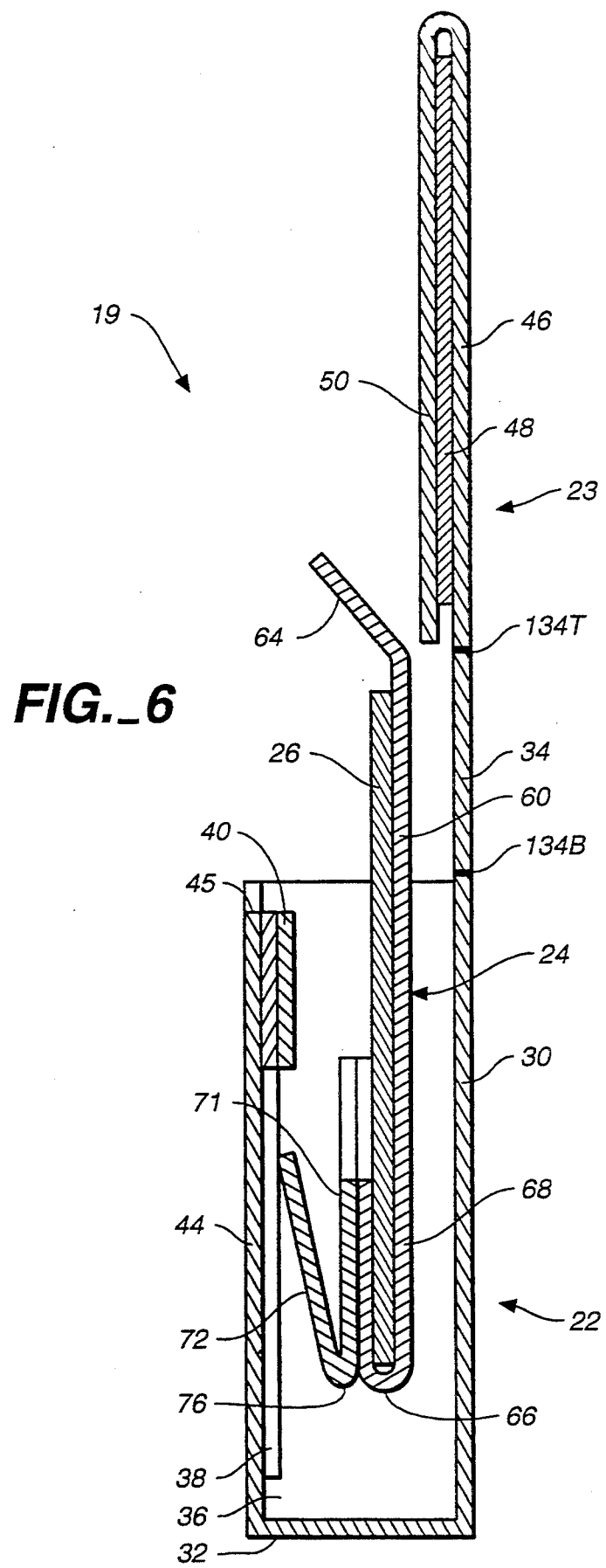
FIG._6

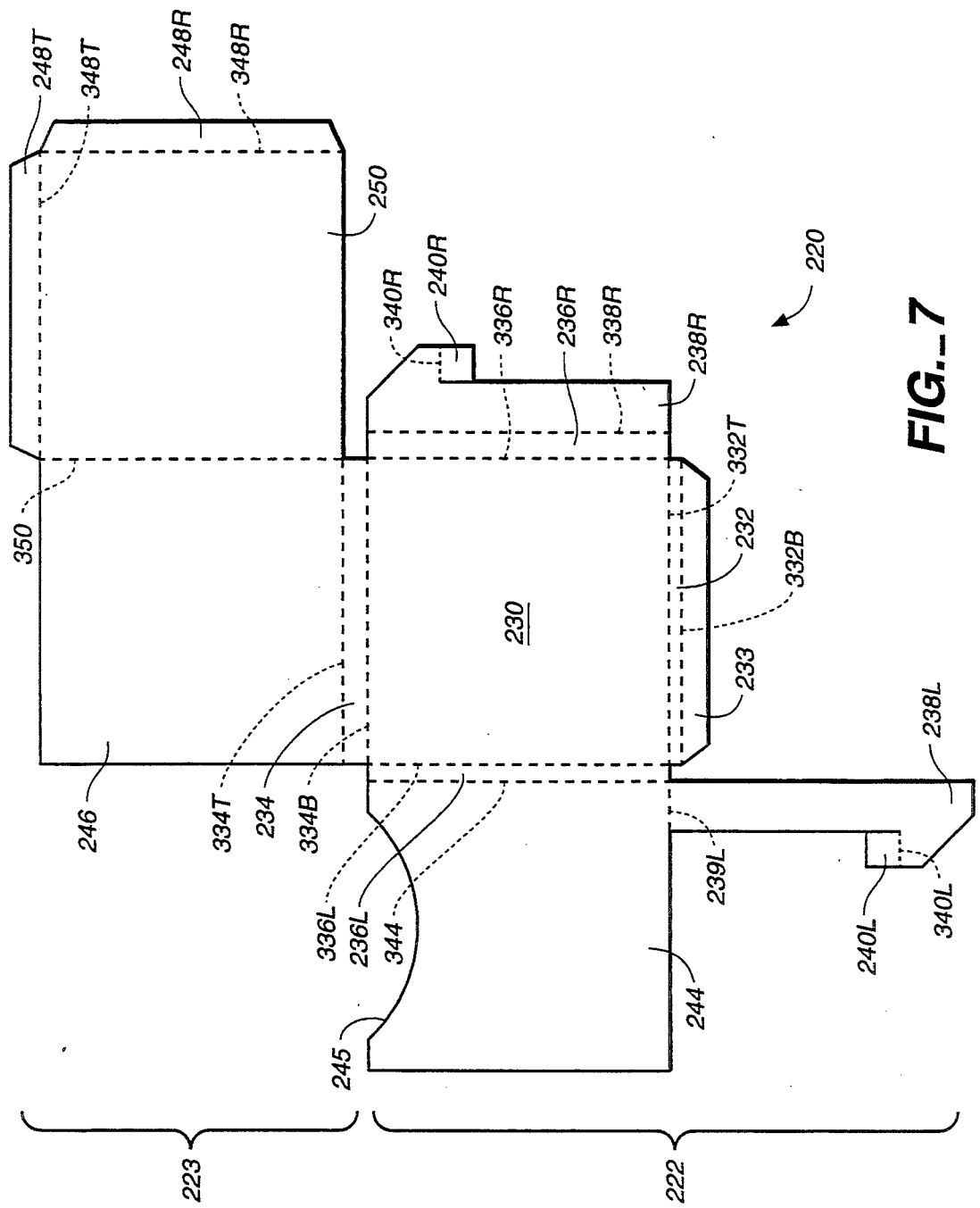
FIG._7

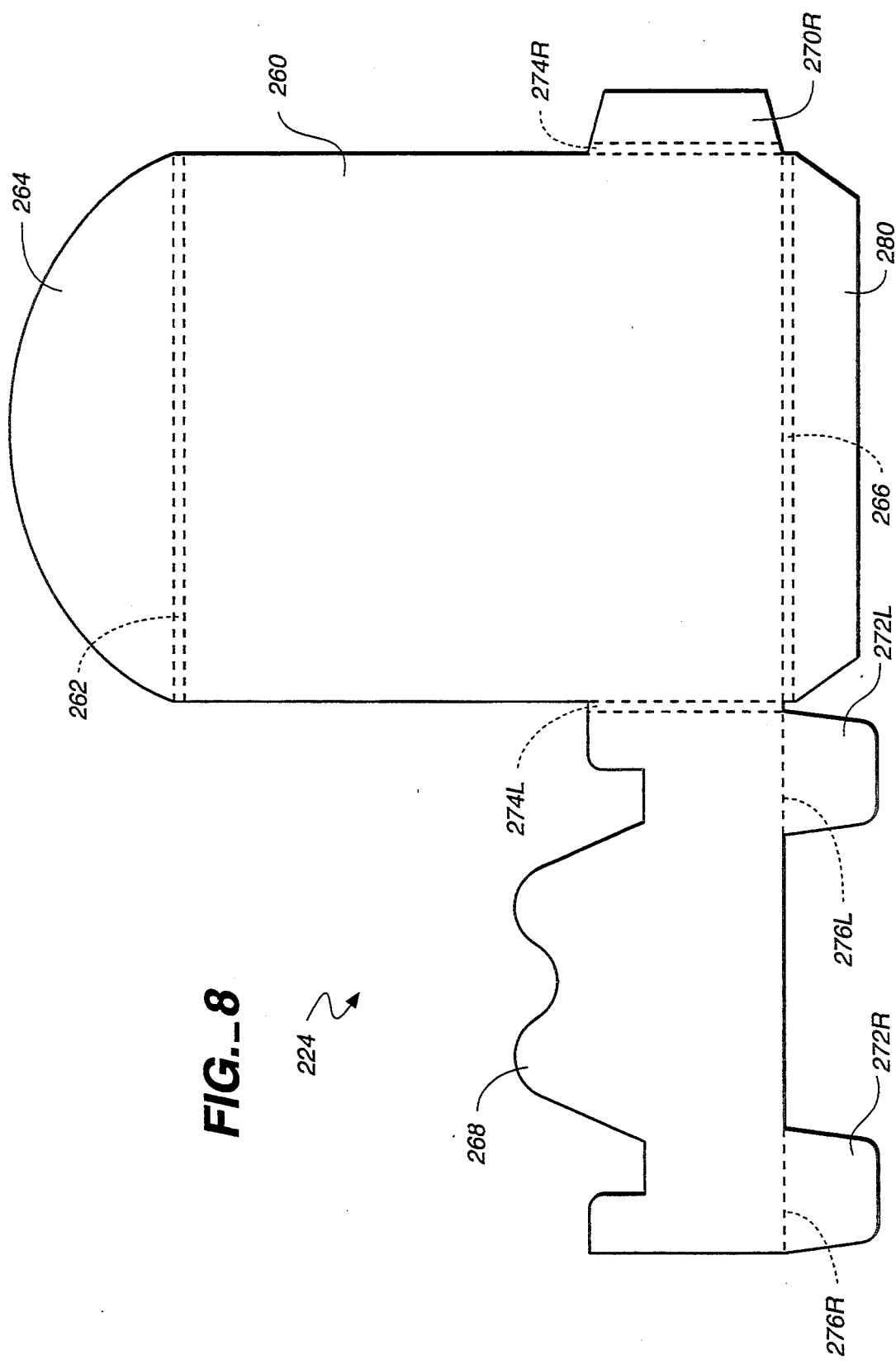
FIG._8

DATA DISK CASE WITH SLIDABLE TRAY SECTION

BACKGROUND OF THE INVENTION

The present invention relates generally to data disk cases, and more particularly to data disk cases fabricated from cardboard sheets.

In the present specification the term "data disk" is meant to include any substantially planar object which may retain data, regardless of size, shape, or the method of encryption of data. Data disks include compact audio disks, CD ROM disks, long-playing phonograph records, 3.5 inch floppy disks, and 5.25 inch floppy disks.

Recent rapid advances in microelectronic technology, have made it possible to store immense amounts of digital data on small data disks. With the increasing prevalence of data disks in modern life comes a need for a compact, efficient, inexpensive protective package for data disks.

Compact disk audio recordings provide high-fidelity sound reproduction. The sound is encoded in a digital format that provides a large dynamic range and a frequency response from 20 Hz to 20 kHz. Most compact disk players have error determination means so that the reading of the disk is relatively insensitive to contamination or defects on the data surface. However, scratches or dirt on the data surface can cause the disk player to misread the information on the disk, thereby generating noise. It is therefore important to provide storage means for compact disks which allows a user to remove and return the disk from the storage means with a minimum of abrasion to the data surface and without having to touch the data surface.

Until recently, compact disk audio recordings have been predominantly sold in plastic "jewel boxes," and the jewel boxes have been packaged in larger cardboard boxes to prevent shoplifting. The jewel box allows a user to remove the disk from the box without touching the data surface. However, this packaging is wasteful since the cardboard portion of the package is immediately discarded after the compact disk is purchased by the consumer. Furthermore, jewel boxes are manufactured from nonrenewable resources, they are not biodegradable, and they are more expensive than packaging produced predominantly from cardboard and/or paper.

Computer data may be stored on small magnetic disks, commonly called "floppy disks." Because the data can be rendered unreadable if the floppy disk is bent, in the standard 3.5 inch format the magnetic disk is protected by a stiff durable plastic case. In the standard 5.25 inch format the magnetic disk is encased in a less stiff plastic case, and is therefore more susceptible to damage. Standard 5.25 inch disks are generally sold in sturdy plastic containers to prevent damage to the disks. Because of the expense of plastic floppy disk containers, such containers are generally made for storage of about ten floppy disks. Therefore, such containers are unnecessarily bulky if one wishes to only store one floppy disk. Another disadvantage of such containers is that plastics are not biodegradable. It would therefore be advantageous to provide a storage means for floppy disks constructed from cardboard. It would also be advantageous to provide a slim, inexpensive protective package for a single floppy disk.

An object of the present invention is therefore to provide a data disk case fabricated from cardboard.

Another object of the present invention is to provide a cardboard data disk case where the data disk may be inserted and withdrawn from the case without abrasion to the data disk, and without touching the data surface.

Another object of the present invention is to provide a data disk case which can be fabricated easily and inexpensively.

Another object of the present invention is to provide a data disk case having a tray for holding the data disk and a pocket into which the tray slides.

Another object of the present invention is to provide a data disk case with a tray for holding the data disk and a pocket into which the tray slides, the pocket and the tray each being fabricated from a single sheet of cardboard.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a data disk case constructed from a first piece of cardboard to provide a tray, and a second piece of cardboard to provide a pocket of a data disk case. The tray has a spring tab on an exterior surface. The pocket has a catch tab which aligns with the spring tab upon insertion of the tray into the pocket. When the tray is pulled from the pocket an upper edge of the spring tab slides into a lower edge of the catch tab, thereby preventing the tray from sliding completely out of the pocket.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 1 is a perspective view of the data disk case of the present invention with the tray outside the pocket.

FIG. 2 is a perspective view of the data disk case of the present invention with a portion of the tray inside the pocket.

FIG. 3 is a view of a cardboard section from which the pocket section is fabricated by folding and gluing.

FIG. 4 is a view of the pocket section with the catch tabs folded and glued against the pocket glue flaps, and the booklet sleeve glue flaps and the pocket glue flaps folded inward.

FIG. 5 is a view of a cardboard section from which the tray is fabricated by folding and gluing.

FIG. 6 is a cross-sectional view through the left side of the case of FIG. 2.

FIG. 7 is a view of an alternate cardboard section from which a pocket may be constructed.

FIG. 8 is a view of an alternate cardboard section from which a tray may be constructed.

DESCRIPTION OF THE PREFERRED EMBODIMENT

The present invention will be described in terms of the preferred embodiment. A preferred embodiment of the data disk case 19 of the present invention is shown in FIGS. 1 and 2. It should be noted that although the following discussion will be in terms of data disks, the invention is directed to storage means for any substantially planar data storage object regardless of the shape of the object; the data disks may be round like a compact disk or rectangular like a floppy disk.

In FIG. 1 a tray section 24 holding a data disk 26 is located outside the interior of a pocket section 22 of a body portion 20 of the case 19. A booklet sleeve 23 extends from the top of the rear wall of the pocket section 22. The booklet sleeve 23 may store printed materials, such as a booklet or a poster. Left and right glue flaps 70L and 70R are mounted at the lower left and right corners of the bottom stop 68, respectively. A data disk 26 resting on the base 60 of the tray 24 is constrained to the tray 24 by a pull tab 64 at the top of the tray 24, by a bottom stop 68 extending from the bottom edge 66 of the base 60, and left and right edges 74L and 74R of the left and right glue flaps 70L and 70R. Effectively, the bottom edge 66 and the left and right edges 74L and 74R act as sides of the container provided by the tray 24. The glue flaps 70L and 70R consist of left and right bases 71L and 71R which are mounted against the bottom stop 68, and left and right spring tabs 72L and 72R which extend upwards from the bottom edges of the left and right glue flaps 70L and 70R, respectively. (Henceforth, left and right elements which share a common reference numeric value but differ in the final appended letter may be collectively referenced by the common numeric value with the appended letter omitted.)

The dimensions of the tray 24 are such that it may be inserted into the orthorhombic interior of the pocket 22, as shown in FIG. 2. Once inserted, the range of motion of the tray 24 is limited since the upper edge of fingers 72 of glue flaps 70 catch on the lower edges catch tabs (not shown) located in the interior of the pocket 22. The pull tab 64 allows a user to move the tray 24 relative to the pocket 22 without touching the data disk 26.

When the tray 24 is pulled to its maximum vertical position relative to the pocket 22 the disk 26 may be removed. Since the folds 74 of the glue flaps 70 have a height less than half the height of the disk 26 the disk may be removed from the tray 24 by holding the side edges. Or, since the bottom stop 68 does not cover the central hole 27 of the disk 26, the disk 26 may be removed by hold the top of the disk 26 and the central hole 27.

The body section 20 is constructed from the single planar sheet of cardboard shown in FIG. 3. In the figures the dashed lines represent scores at edges of sections of components of the case 19 which will become fold lines. The type of score, i.e., cut or press, will be specified below. The body 20 has a pocket section 22, and a booklet sleeve section 23 joined to the pocket section 22 by a hinge 34. The booklet sleeve section 23 has a back face 46, a front face 50 extending from the top edge 150 of the back face 46, and left and right glue flaps 48L and 48R extending from the left and right edges 148L and 148R of the back face 46, respectively. (It should be noted that directions, such as back, front, top, bottom, left and right, are to be taken relative to the case when assembled as depicted in FIGS. 1 and 2. The relationships between orientations of the components of the case in FIGS. 1 and 2 and the rest of the figures will become clear in the discussion below.)

The pocket section 22 consists of a back wall 30, a bottom wall 32 extending from the bottom edge 132 of the back wall 30, left and right walls 36L and 36R extending from the left and right edges 136L and 136R of the back wall 30, a front wall 44 extending from the front edge 144 of the bottom wall 32, and left and right glue flaps 38L and 138R extending from the left and right edges 138L and 138R of the left and right walls 36L and 36R of the pocket. The sleeve front face 50, sleeve back face 46, hinge 34, pocket back wall 30, and pocket bottom wall 32 are each rectangular sections of the cardboard. The pocket front wall 44 has straight left and right sides, and a top edge 45 which is substantially a circular arc. Each pocket glue flap 38 has a wider region near the top from which the catch tabs 40 extend downwards when the sheet is unfolded. The catch tabs 40 are rectangular, and in the unfolded configuration the inner edge of each catch tab 40 is coincident with an outer edge of the glue flap 38 from which it extends.

FIG. 4 shows the body 20 of the case 19 with the glue flaps 48 and 38 folded in. The sleeve glue flaps 48 are folded at the edges 148 of the back wall 46 of the booklet sleeve section 23 against the face of the back wall 46. The side walls 36 of the pocket section 22 are folded at the edges 136 so that they are perpendicular to the back wall 30. The pocket glue flaps 38 are folded at the edges 138 of the walls 36 perpendicular to the pocket walls 36, so that the glue flaps 38 are parallel to the back wall 30. The catch tabs 40 have been folded and glued against the surface of the glue flaps 38 which now face the back wall 30, and so are not visible in FIG. 4.

To complete the construction of the body 20 of the case 19 the bottom wall 32 is folded at the bottom edge 132 of the pocket section 22 to be perpendicular to the back wall 30, and the front wall 44 is folded at the bottom edge 144 thereof to be perpendicular to the bottom wall 32 and parallel to the back wall 30. The front wall 44 is then glued to the pocket glue flaps 38 to provide a pocket for the tray section 24. The front wall 50 of the booklet sleeve section 23 is folded at the top edge 150 of the back wall 46 of the sleeve 23 and glued to the glue flaps 48 to form an internal cavity in the sleeve section 23. When these folding and gluing steps are completed the body portion 20 of the case 19 appears as shown in FIG. 1.

Although the case 19 as described above may Be constructed with the aforementioned elements having a range of dimensions, and the present invention is not limited to a particular set of dimensions, certain constructions are preferred for promoting the objects of the present invention. One such preferred construction for use in storage of compact disks is described here. The sleeve front face 50, sleeve back face 46, hinge 34, pocket back wall 30, pocket bottom wall 32, and pocket front wall 44 have heights of 4¾ inches, 4 15/16 inches, 11/32 inches, 4 15/16 inches, ¼ inches, and 4 27/32 inches, respectively, and widths of 4 27/32 inches. The top and bottom edges of the pocket left and right walls 36 are inset 1/32 inches from the top and bottom edges 134B and 132 of the back wall 30, respectively. The pocket left and right walls are 7/32 inches wide. The narrow part of the pocket glue flaps 38 have a width of ⅝ inches, the wide part of the pocket glue flaps 38 have a width of 1 inch. The catch tabs 40 have a vertical length of ⅝ inches and a horizontal width of ⅜ inches. The glue tabs 48 of the booklet sleeve section 23 have a width of ¾ inches, and are inset 1/16 from the top edge 150 of the back wall 46 of the sleeve section 23, and 3/16 inches from the bottom edge 134T of the back wall 46. The grain direction of the cardboard is horizontal.

The tray 24 of the case 19 is constructed from a single planar cardboard sheet. As shown in FIG. 5, extending from a top edge 62 of a base section 60 of the tray 24 is a pull tab 64. A double cut or press score 62 allows the pull tab 64 to pivot relative to the base 60. Extending from the bottom edge of the base section 60 is a bottom stop 68. A double press score 66 between the base 60 and the bottom stop 68 allows the bottom stop 68 to be folded up against the base 60 as shown in FIGS. 1 and 2. The region between the two scores of the double score 66 acts as a bottom wall, and provides some depth between the base 60 and the bottom stop 68. (It should be noted that even if the bottom stop 68 and the base 60 were joined by a single score, the fold between the two sections 60 and 68 would still be considered to function as a bottom wall.) The bottom stop 68 has two outside protuberances 67, two inside protuberances 65 and a central valley 69.

Left and right glue flaps 70L and 70R extend from the bottom of the left and right edges of the base 60, respectively. The base section 71 of each glue flap 70 is attached to the base 60 at double score 74, and the spring tab 72 of the glue flap 70 extends from the bottom of the base section 71 at score 76. The spring tabs 72 are roughly rectangular. Each base section 71 is roughly rectangular with a rectangular area missing from the upper outside corner. The assembly of the tray 24 is completed by folding and gluing the bases 71 of the glue flaps 70 against the bottom stop 68 (which has been folded up against the base 60 as described above), and folding the spring tabs 72 up against the spring tab bases 71 so that the tray 24 appears as shown in FIG. 1. It should be noted that the spring tabs 72 should extend outward slightly from the tray 24 so that when the tray 24 is in the pocket 24 the fingers 72 will scrape against the interior of the pocket 22. Along the top edge of the bottom stop 68, the outside regions have a contour coinciding with that of the top of the bases 71 of the glue flap 70.

In the preferred embodiment of the present invention the base 60 of the tray 24 has a height of 4 25/32 inches and a width of 4¾ inches. The width of the tray 24 being less than the width of the pocket 22 (which, as mentioned above, is 4 27/32 inches) allows the tray 24 to be moved within the pocket. The two scores 62 at the top of the base 60 are separated by 3/32 inches, and the pull tab 64 extends ⅜ inches beyond the two scores 62. The bases 71 of the glue flaps 70 are 1¾ inches high and extend 1 inch beyond the double scores 74 attaching them to the base 60. The distance between the scores 74 connecting the glue flaps 70 to the base 60 is 3/32 inches. The bottom stop 68 of the tray 24 has a width which is 1/16 inches less than the width of the base 60 of the tray so that the bases 71 of the glue flaps 70 can be folded over the bottom stop 68. The spring tabs 72 of the glue flaps 70 have a height of 1¼ inches and a width equal to that of the bases 71. The central valley 69 of the bottom stop 68 has a height of 2 inches and the two inside protuberances 65 have heights of 2⅜ inches. These dimensions of the bottom stop 68 allow a user access to the central hole 27 in the data disk 26, as shown in FIGS. 1 and 2. The grain direction of the cardboard is vertical.

A view of the case as shown in FIG. 2 through a section including a catch tab 40 and a spring tab 72 is provided in FIG. 6. (Letter suffixes to the reference numerals have been omitted in FIG. 6 since only the lefthand components are shown in the figure.) Here it can be seen that a portion of the tray 24 holding the data disk 26 is located inside the orthorhombic pocket 22 defined by the bottom wall 32, the front wall 44, the back wall 30, and the side walls 36. The data disk 26 is constrained to the tray 24 by the base 60, the bottom stop 68, the pull tab 64, and the bottom and side walls effectively formed by the bottom and side folds 66 and 74 (not shown in FIG. 6). Because the booklet sleeve section 23 is aligned with the back wall 30, the pocket 22 is open and the tray 24 can be moved up and down by pushing and pulling on the pull tab 64.

As the tray 24 is moved up and down, the pivotable spring tab 72 of the glue flap 70 scrapes against the surface of the case glue flap 38. When the upwards-facing ridge provided by the top edge of the spring tab 72 reaches the downwards-facing ridge provided by the bottom edge of the catch tab 40 the tray 24 can no longer be moved upwards. Therefore, the tray 24 is constrained to be partially within the pocket 22. When the tray 24 rests against the bottom wall 32 of the pocket 22, the pocket 22 may be closed by folding the booklet sleeve section 23 at the scores 134T and 134B at the top and bottom of the hinge 34 so that the booklet sleeve 23 is against the front face 44 of the pocket 22. When the booklet sleeve 23 is pivoted to be roughly aligned with the back wall 30 of the pocket 22 the tray 24 can be pulled out of the pocket 22 far enough that the central hole 27 of the data disk 26 can be accessed, and the data disk 26 can be lifted from the tray 24.

When storing a data disk 26, the tray 24 is pulled up to its highest position, the disk 26 is inserted into the tray 24 so that the bottom of the disk rests against the fold 66 between the base 60 and the bottom stop 68. Therefore, the fold 66 acts as a bottom wall for the tray 24. Then the pull tab 64 is folded down against the data disk 26 and the tray 24 is positioned fully within the pocket 22 by pushing down on the fold 62 at top of the base 60. Therefore most of the motion of the data disk 26 relative to the pocket 22 is performed when the data disk 26 is already positioned in the tray 24.

It should be noted that the data disk 19 case of the present invention minimizes abrasions to the data disk 26 since (i) most of the motion of the data disk 26 relative to the pocket 22 is performed with the data disk 26 in the tray 24, (ii) the pull tab 64 and the bottom stop 68 protect the data disk 26 from the interior surface of the front wall 44, and (iii) the bottom stop 68, the pocket glue flaps 38, the spring tab bases 71 and the spring tab fingers 72 distance the data disk 26 from the inside surface of the front wall 44 of the pocket 22.

It should be noted that the sheets shown in FIGS. 3 and 5 are not the only way a case having the above-discussed arrangement of catch tabs and glue flaps may be constructed. Sheets with many other shapes may be folded and glued to provide these features. An alternate sheet which may be folded to provide such a pocket 220 is shown in FIG. 7, and an alternate sheet to provide such a tray 224 is shown in FIG. 8.

As shown in FIG. 7, a booklet sleeve section 223 consists of a back wall 246, a front wall 250 connected to the back wall 246 at score line 350, and top and right glue flaps 248T and 248R connected to the front wall 250 at score lines 348T and 348R, respectively. The booklet sleeve section 223 is connected to the pocket section 222 by a hinge 234. The hinge 234 is bounded by upper and lower score lines 334T and 334B, respectively. The pocket section 222 consists of a back wall 230, left and right side walls 236L and 236R connected to the base 230 at score lines 336L and 336R, a front wall 244 connected to the left side wall 236L at a score line 344, a bottom wall 232 connected to the back wall 230 at a score line 332T, a glue flap 233 connected to the bottom wall 232 at a score line 332B, a right glue flap 238R connected to the right side wall 236R at a score line 338R, a left glue flap 238L extending from the bottom edge of the front wall 244 at a score line 239L, and left and right catch tabs 240L and 240R extending from left and right glue flaps 238L and 238R at score lines 340L and 340R, respectively.

The booklet sleeve section 223 of pocket 220 is constructed by folding the top and right glue flaps 248T and 248R at score lines 348T and 348R against the inside of the booklet sleeve front wall 250, folding the front wall 250 at score 350 against the back wall 246, and gluing the flaps 248T and 248R to the back wall 246. Notice that this provides a booklet sleeve section 223 which has an opening on the left side.

The alternate pocket section 222 is constructed by folding the left glue flap 238L at score line 239L against the inside of the pocket front wall 244, and gluing it in place. The catch tabs 240 are folded at score lines 340 against the inside surfaces of the glue flaps 238, and glued in place. Then the bottom and right walls 232 and 236R are folded at score lines 332T and 336R to be perpendicular to the back wall 230, and the glue flaps 233 and 238R are folded at score lines 332B and 338R to be parallel to the back wall 230. Finally, the left side wall 236L is folded at score 336L to be perpendicular to the back wall 230, and the front wall 244 is folded at score 344 to be parallel to the back wall 230, and is glued to the bottom and right glue flaps 233 and 238R, respectively. This pocket 220 has the appearance of the one shown in FIGS. 1 and 2.

The alternative tray section 224 of FIG. 8 consists of a base 260, a pull tab 264 extending from the top of the base 260 at top double cut score 262, a right glue flap 270R extending from the bottom right edge of the base 260 at right double cut score 274R, a bottom glue flap 280 extending from the bottom of the base 260 at bottom double cut score 266, a front panel 268 extending from the bottom right edge of the base 260 at right double cut score 274L, and left and right spring tab fingers 272L and 272R extending from the bottom of the front panel 268 at panel scores 276L and 276R, respectively.

The alternate tray section 224 is constructed by folding the bottom and right glue flaps 280 and 270R at bottom and right double cut scores 266 and 274R against the base 260, respectively. Then the front panel 268 is folded against the bottom and right glue flaps 280 and 270R and glued to them. The spring tab fingers 272 are then folded at score 276 so that they extend upwards and outward from the front panel 268. It should be noted that the alternate tray section 224 has an appearance very similar to that of the tray section 24 of FIGS. 1 and 2.

In summary, an apparatus and method for a data disk case has been described. The present invention has been described in terms of a preferred embodiment. The invention, however, is not limited to the embodiment depicted and described, and many variations are within the scope of the invention. For instance: the case may be fabricated by bonding sections of cardboard to each other using methods other than gluing; the case may be made from a planar foldable material other than cardboard; the booklet sleeve glue tabs may extend from the front face of the booklet sleeve section; a booklet may be inserted into the booklet sleeve section from the side or from the top; the booklet sleeve section may have no enclosures, or multiple enclosures as illustrated in U.S. Pat. No. 4,709,812 issued to D. W. Kosterka on Dec. 1, 1987, for instance; the pocket may have only a single catch tab and the tray may have only a single spring tab, and the spring tab and catch tab need not be located near the side of the case; the catch tab need not be located on the side of the tray in which the data disk is inserted, e.g. the catch tab may be located on the outside of the back wall of the tray, or on the side of the tray; the inside surface of the spring tab finger may be glued to the outside surface of the bottom stop or the spring tab base; the spring tab may be located on the pocket section and the catch tab may be located on the tray section; the case may have multiple pockets for holding multiple disks; etc. Therefore, it should be noted that the scope of the invention is defined by the appended claims.

What is claimed is:

1. A case for storage of a data disk comprising:

a pocket section formed from folding a first sheet of a first material and bonding it to itself, said pocket section having an interior region with a pocket bottom wall, a pocket front wall, a pocket back wall, first and second pocket side walls, and a top opening, said pocket front wall including a first portion of said first sheet extending between said first and second pocket side walls and between said pocket bottom wall and a free edge of said pocket front wall, and a second portion of said first sheet bonded near upper and lower edges of said second portion to an interior face of said first portion of said first sheet, so as to maintain substantially the entirety of said upper and lower edges against said first sheet, so as to form a catch tab providing a stationary downwards-facing ridge in said interior region on said pocket front wall at a first height above said pocket bottom wall; and a tray section slidable in and constrained to said pocket section, said tray section for holding said data disk formed from folding a second sheet of a second material and bonding it to itself, an exterior face of a tray section front wall having an upwards-facing ridge biased to slide along said first portion of said first sheet, said tray section being movable between a lower position and an upper position, in said upper position said upwards-facing ridge is in contact with said downwards-facing ridge and said tray section is restrained from further upwards motion, and in said lower position said upwards-facing ridge is at a second height above said pocket bottom wall, said second height being less than said first height.

2. The case of claim 1 wherein said pocket section has a pocket depth from said pocket front wall to said pocket back wall, and a pocket width from said first pocket side wall to said second pocket side wall, said pocket width being many times greater than said pocket depth so that said pocket is substantially flat.

3. The case of claim 1 wherein said tray section has left and right tray side walls, said tray side walls having a height less than half that of said data disk, whereby said data disk can be removed from said tray section without touching a data surface of said data disk.

4. The case of claim 2 wherein said data disk has a central aperture, an edge of said aperture having a bottom point when said data disk is oriented for insertion in the case, and said tray section front wall has a central portion with a height less than said bottom point of said central aperture so that said data disk may be grasped without touching a data surface of said data disk.

5. The case of claim 1 wherein said pocket section has a cover flap which may be rotated between a closed position where said cover flap covers said top opening and an open position where said cover flap does not cover said top opening.

6. The case of claim 5 wherein said cover flap has an internal cavity.

7. The case of claim 6 wherein said internal cavity is substantially two-dimensional.

8. The case of claim 1 wherein said tray section front wall is less than half a height of said data disk, whereby said data disk may be loaded into the case with minimal abrasion between said tray section and said data disk.

9. The case of claim 1 wherein in said lower position a bottom of said tray section rests against said pocket bottom wall.

10. The case of claim 1 wherein said first and second materials are cardboard.

11. The case of claim 1 wherein said pocket front wall and said pocket back wall each have a greater area than said first and second pocket side walls and said pocket bottom wall.

12. The case of claim 1 wherein said downwards-facing ridge is located more than halfway up said pocket front wall.

13. The case of claim 12 wherein said upwards-facing ridge is located at a free end of a pivotable tab protruding from said tray section front wall.

14. The case of claim 12 further comprising an additional catch tab providing an additional downwards-facing ridge on said interior face of said first portion of said first sheet, and an additional upwards-facing ridge on said exterior face of said tray section front wall, biased to slide along said first portion of said first sheet.

* * * * *